Sept. 30, 1947.    F. H. STARK    2,428,182
CATERPILLAR TRACTOR FRICTION ASSEMBLING AND DISASSEMBLING TOOL
Filed Jan. 26, 1945    2 Sheets-Sheet 2
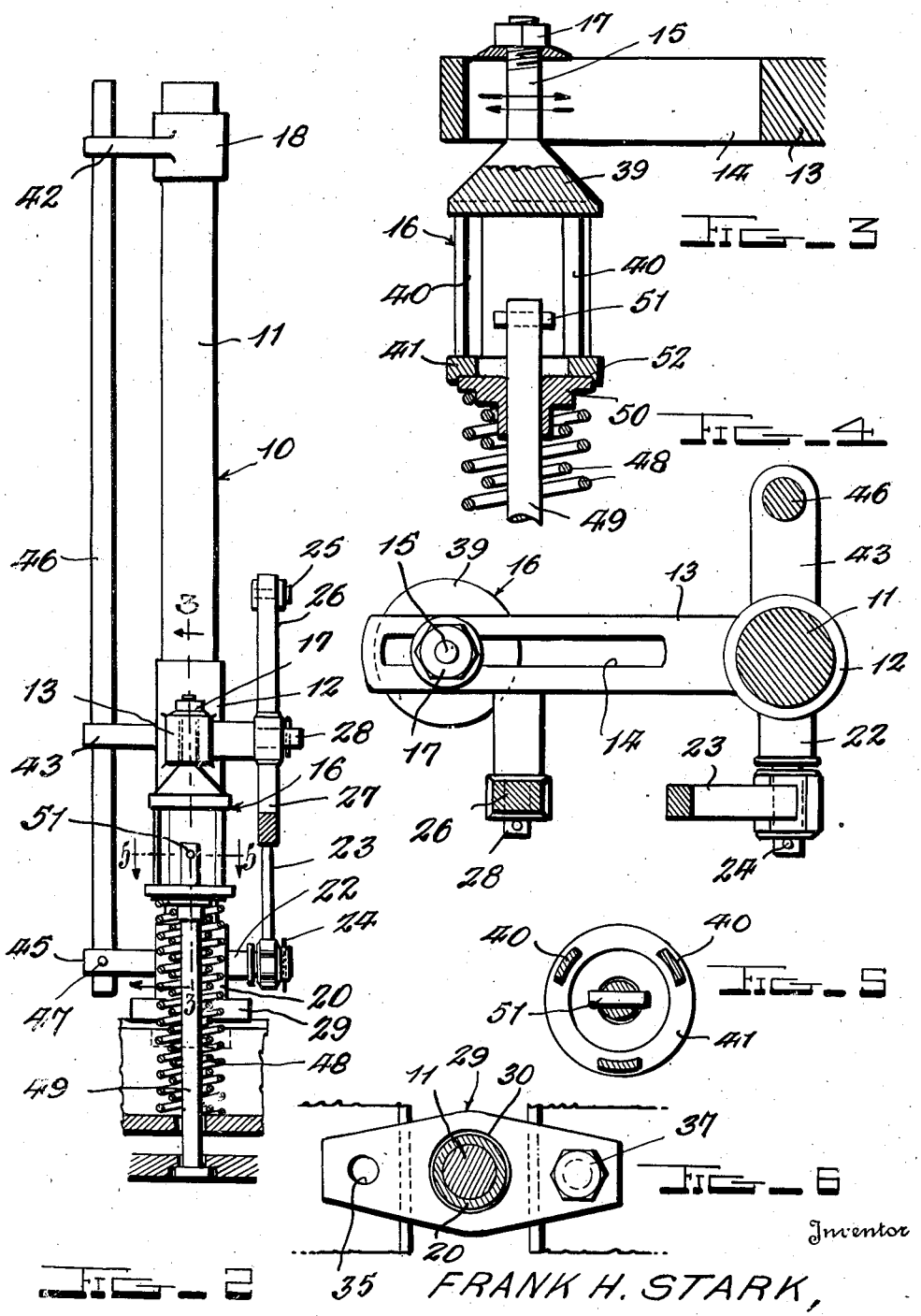
Inventor
FRANK H. STARK,
By Christian R. Nielsen
Attorney Patented Sept. 30, 1947

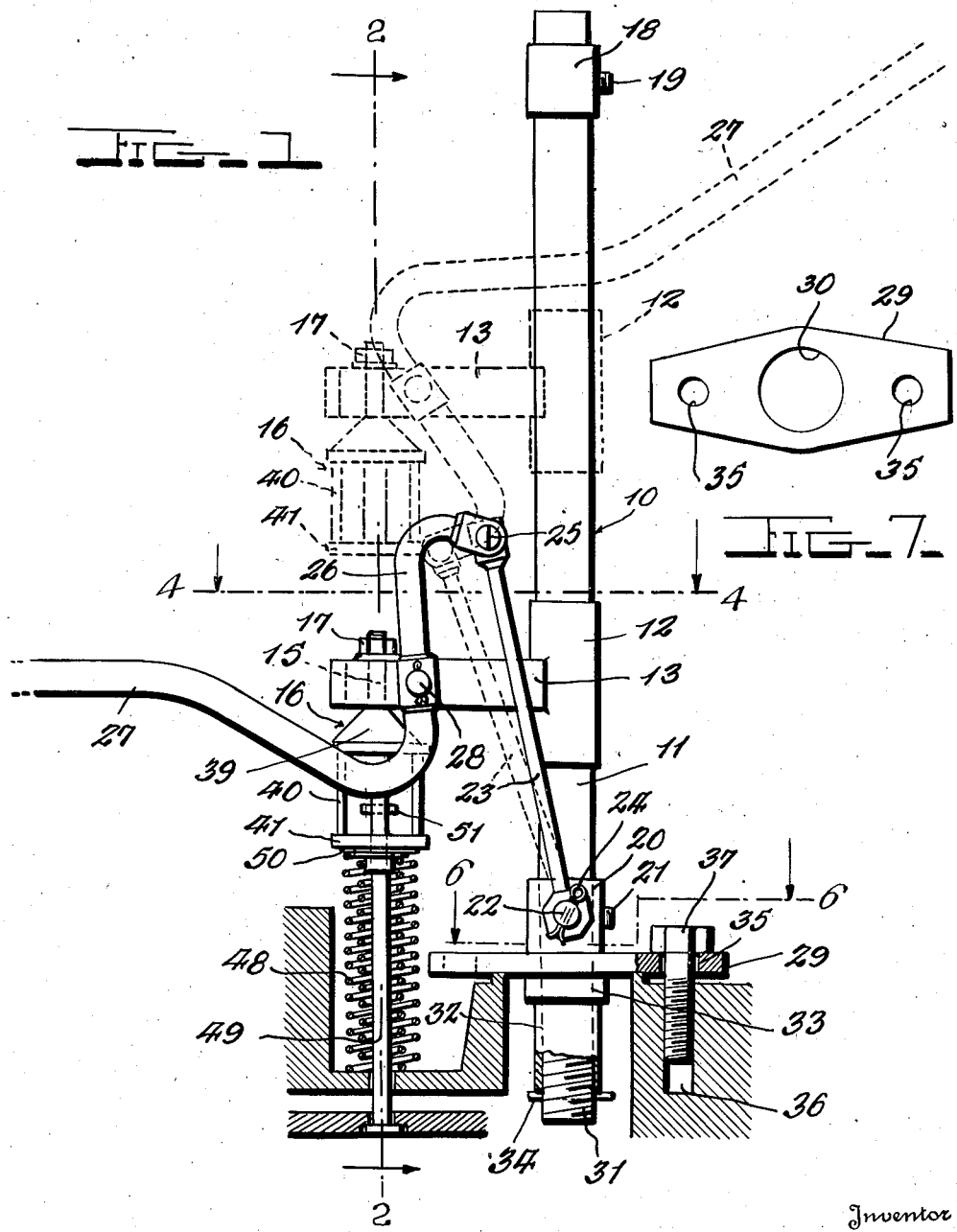

2,428,182

UNITED STATES PATENT OFFICE 2,428,182

CATERPILLAR TRACTOR FRICTION ASSEMBLING AND DISASSEMBLING TOOL

Frank H. Stark, Kathryn, N. Dak.

Application January 26, 1945, Serial No. 574,720

3 Claims. (Cl. 29—227)

1

This invention relates to a tool for readily disassembling and assembling caterpillar tractor frictions and it consists in the constructions, arrangements and combinations herein described and claimed.

The cardinal object of the invention is to provide a tool which may be employed in the removal and replacement of steering clutch springs of the steering clutch assembly of caterpillar tractors.

It is also an object of the invention to provide a tool of simplicity as to construction and operation, as well as to provide for adjustability permitting use of the tool upon various types of tractors.

It is a still further object of the invention to provide a tool of the kind described wherein the moving parts of the device are stabilized by means of a guide bar thereby minimizing strain or binding of the parts and insuring an easy operating tool.

Additional objects, advantages and features of invention will be apparent from the following description and accompanying drawings, wherein Figure 1 is a side elevation of the tool installed upon a clutch assembly, illustrating the assembling and disassembling positions in solid lines, the released position being indicated in dotted lines.

Figure 2 is a section on the line 2—2 of Figure 1.

Figure 3 is a vertical section on the line 3—3 of Figure 2.

Figure 4 is an enlarged cross section on the line 4—4 of Figure 1.

Figure 5 is an enlarged cross section on the line 5—5 of Figure 2.

Figure 6 is a cross section on the line 6—6 of Figure 1.

Figure 7 is a plan view of the mounting plate.

There is illustrated a tool generally indicated by the reference character 10 consisting of a post member 11, upon which there is slidable a sleeve 12, the latter having an arm 13 extended at right angles to the sleeve. The arm 13 is of rectilinear form and substantial thickness. A longitudinally extended slot 14 is provided in the arm 13 and receives therethrough a shaft 15 of a cage member 16. The shaft 15 is threaded and receives a nut and washer 17 for securing the cage 16 in an adjusted position within selected positions along the slot 14, for a purpose to be explained.

Upon the upper end of the post 11 a collar 18 is engaged secured in desired adjusted positions upon the post by means of a set screw 19, and positioned inwardly of the lower end of the post

2 there is a collar 20 which is likewise adjustable upon the post and secured by a set screw 21. The collar 20 includes a trunnion 22 extended at right angles to the collar for pivotally mounting a connecting rod 23 which is secured to the trunnion by means of a cotter pin 24, the opposite end of the connecting rod 23 being pivotally connected as at 25, to a goose-neck 26 of a hand lever 27, the latter being pivotally mounted upon a trunnion 28 extended laterally from the arm 13.

A plate 29 is employed for mounting the tool in position upon the steering clutch assembly, and as may be seen in Figures 6 and 7, the plate is provided with a central opening 30 of a diameter to receive the lower end of the post 11 therethrough but of a diameter less than the collar 20, so that the plate may be brought into abutting relation with the collar. The lower end of the post 11 is threaded as at 31, and receives thereon an interiorly threaded sleeve 32, the latter having a head 33 adapted to abut and clamp the plate 29 against the collar 20. The post 11 is provided with a bore adjacent the lower end thereof and receives a cotter pin 34 to insure retention of the sleeve 32.

Aligned with the opening 30 and disposed at diametrically opposite sides openings 36 are formed, these openings being so spaced as to align with openings 36 of the clutch assembly and receive respective stud bolts 37. These plates will also come in different sizes so as to accommodate the tool to different makes of tractors.

The cage 16 is formed with a head 39 from which the shaft 15 is extended as an integral part thereof, and upon the underside of the head there are three leg members 40 equally spaced circumferentially of the head. The legs 40 are connected at their lower ends by an annular band 41.

As may be seen in Figure 2, the collars 18 and 20 and the arm 13 are each provided with horizontal apertured extensions 42, 45 and 43, respectively. A guide rod 46 is engaged through the aligned apertures but is fixed in the extension 45 by means of a pin 47.

The tool is employed in the removal and replacement of the steering clutch springs, indicated at 48, so that clutch facings and other parts may be repaired or replaced, and in use of the tool, the proper plate 29 being mounted on the post 11, as described, the openings 35 are aligned with the openings 36 of the steering clutch, the openings 36 being ordinarily employed in pulling the steering clutch from the cross shaft of the assembly. The stud bolts 37 are now engaged in the aligned openings and the plate secured firmly to the assembly so as to support the post in an upright position, as shown in Figure 1.

The assembly springs are mounted upon a shaft 49 and retained under compression by means of a spring retainer 50 and a pin 51 engaged through the shaft 49 above the spring retainer. In order to disassemble the clutch, it is necessary to release the shaft and springs, and this is accomplished by aligning the cage 16 directly above the retainer 50 so as to engage the latter upon downward swinging movement of the lever 27 as indicated in solid lines in Figure 1.

The band 41 of the cage is recessed as at 52, forming a seat so as to engage the retainer. Further downward movement of the cage 16 will cause a downward movement of the retainer and compression of the springs 48, exposing the pin 51 for ready withdrawal. Upon removal of the pin, the lever is moved to the dotted line position in Figure 1, the sleeve 12 sliding on the post 11 and guided and stabilized by the rod 46. When repair of the clutch has been made, the shaft, springs, and retainer are assembled in their proper order and the cage 16 again brought into position upon the retainer, the springs compressed and the pin replaced.

The location of the spring assemblies will vary in different tractors, and it will be seen that the cage 16 may be readily adjusted along the slot 14 so that it may be readily centered above the spring retainer, and also, the length of the shaft 49 and assembly springs will vary, requiring a greater or lesser movement of the cage, and this may be accomplished by adjustment of the collar 20 and the sleeve 32 upwardly or downwardly upon the post 11.

The cages 16 will also be provided in different diameters so as to accommodate different diameters of spring retainers, and these may be readily installed upon the arm 13 by inserting the shaft 15 through the slot 14 and applying the washer and nut upon the shaft 15.

While I have shown and described a preferred form of the tool, this is by way of illustration only, and I consider as my own all such modifications in construction as fairly fall within the scope of the appended claims.

I claim:

1. A tool for disassembling and assembling spring elements of tractor frictions comprising a post member having means for mounting upon the housing of said frictions, a collar adjustably fixed upon the post adjacent said mounting means, a sleeve slidably mounted on said post above said collar, an arm carried by said sleeve and extended at right angles thereto, a cage member depending from said arm and aligned with a spring element of the tractor frictions, a connecting rod pivotally connected to said collar, a hand lever pivotally mounted on said arm having pivotal connection with said connecting rod, a guide rod parallel to and connected to said post, said sleeve having a lateral extension apertured for reception of said guide rod.

2. A tool for disassembling and assembling spring elements of tractor frictions comprising a post having means for mounting upon the housing of said frictions, a collar fixed upon the post adjacent said mounting means, said collar being adjustable longitudinally of the post, an adjustable collar on said post beneath the mounting means, a sleeve slidably mounted on said post above said collar, an arm carried by said sleeve and extended at right angles thereto, said arm having a longitudinal slot, a cage member, said cage having a shaft disposed within the slot, means associated with the shaft to secure the cage in adjusted positions within the slot for presenting the cage above the spring element of a traction friction, an adjustable collar adjacent the upper end of the post, a lateral extension on said first and second named collars, a guide rod fixed in the extension of the first collar and slidable through the extension of the second collar, a lateral extension on the sleeve having an opening for receiving said guide rod, a connecting rod pivotally connected to said first named collar, and a hand lever pivotally mounted on said arm having pivoted connection with said connecting rod.

3. The structure of claim 2 in which said cage has open sides permitting access to an assembly pin of the spring assembly.

FRANK H. STARK.

REFERENCES CITED

The following references are of record in the file of this patent:

UNITED STATES PATENTS

| Number | Name | Date |
| --- | --- | --- |
| 1,426,799 | Weil | Aug. 22, 1922 |
| 1,436,393 | Harsley et al. | Nov. 21, 1922 |
| 1,695,610 | Ritter | Dec. 18, 1928 |
| 1,730,092 | Raymond | Oct. 1, 1929 |
| 1,615,053 | Szandrowsky | Jan. 18, 1927 |